(12) United States Patent
Elgarat

(10) Patent No.: US 9,122,799 B1
(45) Date of Patent: Sep. 1, 2015

(54) SYSTEM, METHOD, AND COMPUTER PROGRAM FOR SOFTWARE TESTING PROJECT DESIGN AND EXECUTION UTILIZING A MOCKUP

(71) Applicant: Amdocs Software Systems Limited, Dublin 3 (IE)

(72) Inventor: Sharon Elgarat, Kibbutz Mefalsim (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/288,328

(22) Filed: May 27, 2014

(51) Int. Cl.
  *G06F 9/44* (2006.01)
  *G06F 11/36* (2006.01)
(52) U.S. Cl.
  CPC .................................. *G06F 11/3664* (2013.01)
(58) Field of Classification Search
  CPC .................................................. G06F 11/3664
  USPC .......................................................... 717/125
  See application file for complete search history.

(56) References Cited

U.S. PATENT DOCUMENTS

2008/0263503 A1*  10/2008  Polly et al. .................... 717/100
2010/0318974 A1*  12/2010  Hrastnik et al. .............. 717/135
2014/0109056 A1*  4/2014   Schissel et al. ............... 717/125

OTHER PUBLICATIONS

Geertjan Wielenga; "GUI Testing on the NetBeans Platform (Parts 1 & 2)"; Oracle blog pages (blogs.oracle.com); Sep. 26, 2007.*
Alexandre Iline, Jiri Skrivanek; "Writing JellyTools Tests Guide"; NetBeans Wiki pages (netbeans.org); May 13, 2011.*
"Test Your DotNet GUI with NUnit and Mock Objects"; CodeFez website (codefez.com) as captured by the Wayback Machine Internet Archive (archive.org) on Apr. 28, 2010.*
"HotGloo is much more than 'just' wireframing"; HotGloo website (hotgloo.com) as captured by the Wayback Machine Internet Archive (archive.org) Mar. 25, 2014.*

* cited by examiner

*Primary Examiner* — Qing Chen
*Assistant Examiner* — Clint Thatcher
(74) *Attorney, Agent, or Firm* — Zilka-Kotab, PC

(57) ABSTRACT

A system, method, and computer program product are provided for software testing project design and execution utilizing a mockup. In use, at least one software testing project to design is identified. Additionally, at least one mockup of the at least one software testing project is generated. Further, one or more testable items associated with the at least one mockup are defined. In addition, one or more test cases associated with the at least one mockup are generated. Furthermore, the one or more test cases are linked to the one or more testable items. Moreover, the at least one mockup including the one or more test cases linked to the one or more testable items is displayed. In one embodiment, a status of the one or more test cases may be updated according to a test execution within the at least one software testing project. Furthermore, at least one defect may be linked to every mockup that showed one or more errors within and/or outside a defined testable item.

11 Claims, 5 Drawing Sheets

FIGURE 3

SYSTEM, METHOD, AND COMPUTER PROGRAM FOR SOFTWARE TESTING PROJECT DESIGN AND EXECUTION UTILIZING A MOCKUP

FIELD OF THE INVENTION

The present invention relates to visual test design and execution.

BACKGROUND

Current test methodologies are free text driven. Such test methodologies require the test designer to describe, in text, the tests expected to be run by the test executer. The test designer is left with a constant conflict of how long to make text descriptions associated with the test. If the text is too short, the test may not be clear enough. If the text is too long the executer might not read all the important parts of the text. As a result, text executers never manage to have all the right data or only the data truly needed.

Additionally, because the current test methodologies are text driven, such methodologies are limited to describe only the exact function being tested. However, test executers often find issues outside the planned tests.

Furthermore, because the current test methodologies are text driven, such methodologies face extreme difficulties when trying to link tests to defects. Thus, test executers may never have a clear view of the issues that were previously reported in a test flow.

There is thus a need for addressing these and/or other issues associated with the prior art.

SUMMARY

A system, method, and computer program product are provided for software testing project design and execution utilizing a mockup. In use, at least one software testing project to design is identified. Additionally, at least one mockup of the at least one software testing project is generated. Further, one or more testable items associated with the at least one mockup are defined. In addition, one or more test cases associated with the at least one mockup are generated. Furthermore, the one or more test cases are linked to the one or more testable items. Moreover, the at least one mockup including the one or more test cases linked to the one or more testable items is displayed. In one embodiment, a status of the one or more test cases may be updated according to a test execution within the at least one software testing project. Furthermore, at least one defect may be linked to every mockup that showed one or more errors within and/or outside a defined testable item.

BRIEF DESCRIPTION OF THE DRAWINGS

FIG. 3 illustrates a mockup for software testing project design and execution, in accordance with one embodiment.

DETAILED DESCRIPTION

Figure 1:
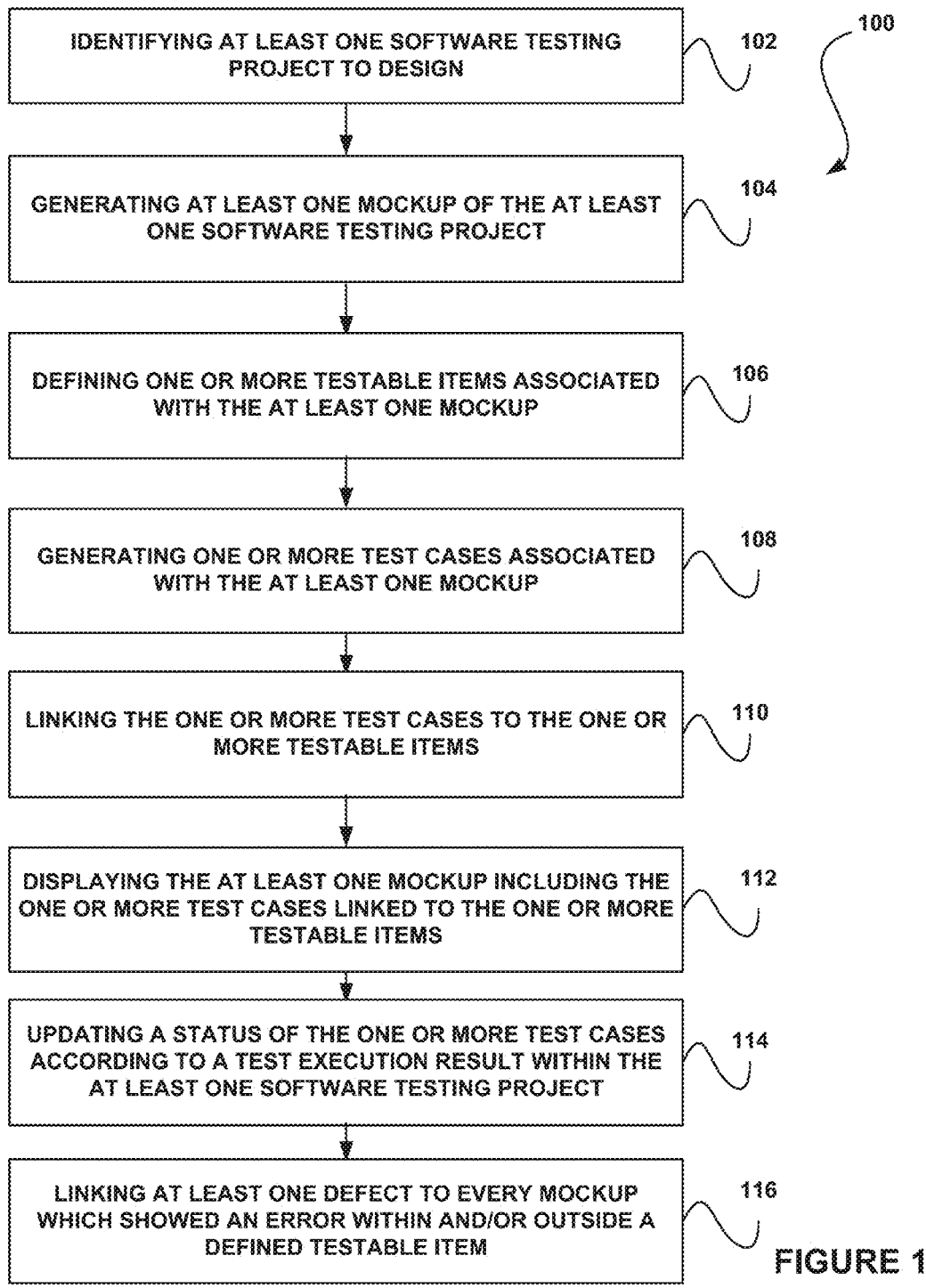
FIG. 1 illustrates a method for software testing project design and execution utilizing a mockup, in accordance with one embodiment.

FIG. 1 illustrates a method 100 for software testing project design and execution utilizing a mockup, in accordance with one embodiment.

As shown, at least one software testing project to design is identified. See operation 102. The software testing project may include any type of software testing project. For example, in one embodiment, the software testing project may be associated with a telecommunication service provider. Of course, the software testing project may be associated with a variety of industries and/or organizations.

Additionally, at least one mockup of the at least one software testing project is generated. See operation 104. In the context of the present description, a mockup refers to any prototype or model that provides at least part of the functionality of a system or computer code (e.g. software, etc.) associated with a testing project that enables testing of a design. The prototype may be imported to and/or designed within the system's computer program.

In one embodiment, the mockup may include a mockup of a graphical user interface associated with the at least one software testing project and/or supporting test tools. In various embodiments, the mockup may include one screen or a plurality of screens.

Further, one or more testable items associated with the at least one mockup are defined. See operation 106. The testable items may include any aspect of a system or software that is capable of being tested. For example, the testable items may include functionality with a plurality of possible input parameters, etc.

In addition, one or more test cases associated with the at least one mockup are generated. See operation 108. Furthermore, the one or more test cases are linked to the one or more testable items. See operation 110.

Moreover, the at least one mockup including the one or more test cases linked to the one or more testable items is displayed. See operation 112. The mockup may identify a testing flow of the one or more testable items. For example, the mockup may show steps to execute as part of a testing flow.

As shown further in FIG. 1, a status of the one or more test cases may be updated according to a test execution within the at least one software testing project. See operation 114. Furthermore, at least one defect may be linked to every mockup that showed one or more errors within and/or outside a defined testable item. See operation 116.

In one embodiment, the test cases may be capable of being tracked in a quality center associated with the testing process. Additionally, the test cases may be capable of being immediately updated (e.g. in response to defects, issues, etc.).

Further, the test cases may include text associated with one or more actions associated with the test cases. The text will be short enough so that the text is not too detailed, but detailed enough to convey important aspects of the test.

The mockup may be utilized for directing a test execution of the software testing project. For example, the mockup may describe a test flow for the test execution of the software testing project. In this case, the test flow may include steps for testing the one or more testable items.

In one embodiment, the mockup may be capable of being annotated with a status associated with the test execution (e.g. by the test executer, etc.). Additionally, in one embodiment, the mockup may be capable of being annotated with defect information associated with the test execution. In this case, the defect information may be viewable by a test group including a plurality of users such that the users may see where any issues have been reported.

In one embodiment, the defect information may be automatically reported to a quality center. Of course, any information associated with the test execution may be automatically reported to the quality center (e.g. information associated with the test cases, etc.).

Utilizing the method 100, a mockup based test designer will be able to focus on presenting efficient information for design to a test executer, without the use of long descriptive sentences. The mockup based test executer will be able to have a clear view of the tests expected to be run, with additional clarity on the details of the test.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
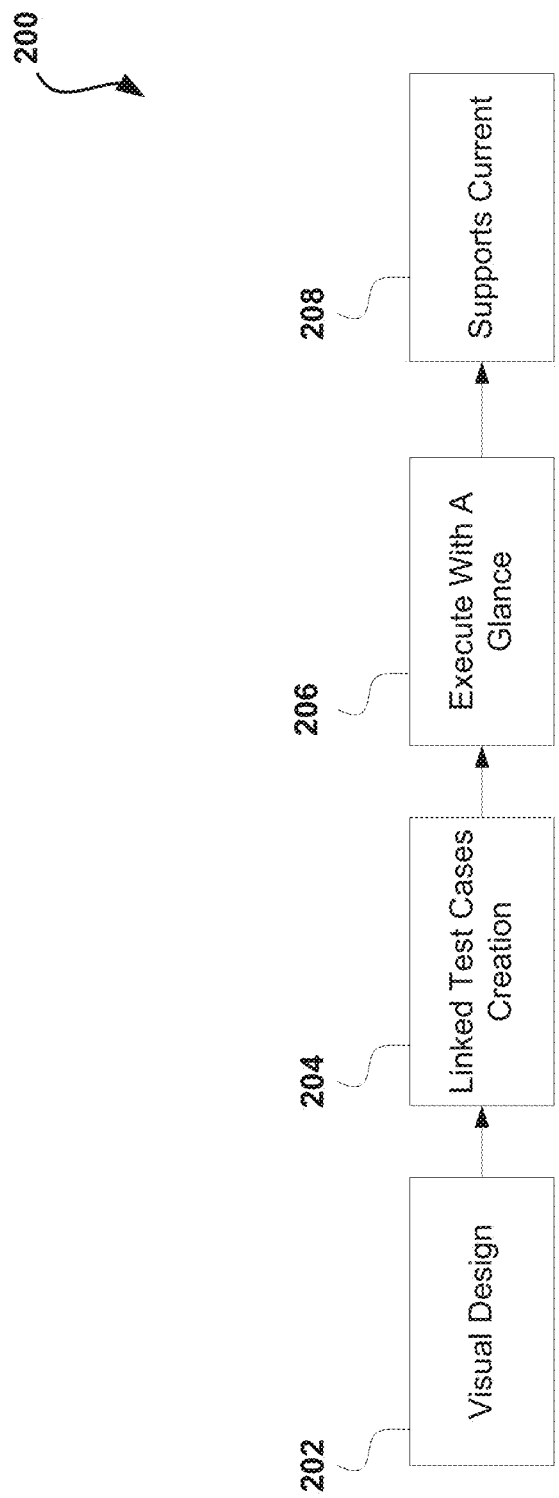
FIG. 2 illustrates a flow diagram for software testing project design and execution utilizing a mockup, in accordance with one embodiment.

FIG. 2 illustrates a flow diagram 200 for software testing project design and execution utilizing a mockup, in accordance with one embodiment. As an option, the flow diagram 200 may be implemented in the context of the details of FIG. 1. Of course, however, the flow diagram 200 may be implemented in the context of any desired environment. Further, the aforementioned definitions may equally apply to the description below.

The flow diagram 200 shows a methodology for allowing a visual testing design and execution. This methodology shifts the focus in testing effort from long descriptions to an intuitive mockup based validation.

In operation, a dedicated visual oriented tool may be utilized to generate a design. See operation 202. In this case, a test designer may create a mockup using a dedicated design mockup tool.

Utilizing the tool, the test designer is able to define testable items on the mockups. Moreover, reviewers have a clear mockup of the system showing tested flows on system lookalike screens, for intuitive and easy review.

Additionally, the tool may support test case generation in a quality center for tracking purposes. For example, the test designer may be able to automatically generate and link test cases to the testable items. See operation 204. The text in the test cases will not be too detailed as execution may not be performed using these entities. The text may be used for tracking and counting purposes.

Further, test execution may be accomplished with a clear view. See operation 206. For example, the tester running the execution (i.e. the test executer) may keep both the system and the testing flow side by side. The test executer may then test based on the mockup flow of testable items, marking any status on the testable items within the mockup.

Additionally, the link to the quality center may allow immediate update of the test cases. In this case, when facing defects, even out of the predefined testable items, the test executer can indicate where the defect is seen on the mockup so all other testers who reach the screen may see that the issue was reported.

Furthermore, the tool may support current reporting mechanisms. See operation 208. For example, the use of quality center test cases and quality center defects allows any of the current reporting mechanisms to still be supported so communications to development and customer groups are not impacted.

Figure 3:
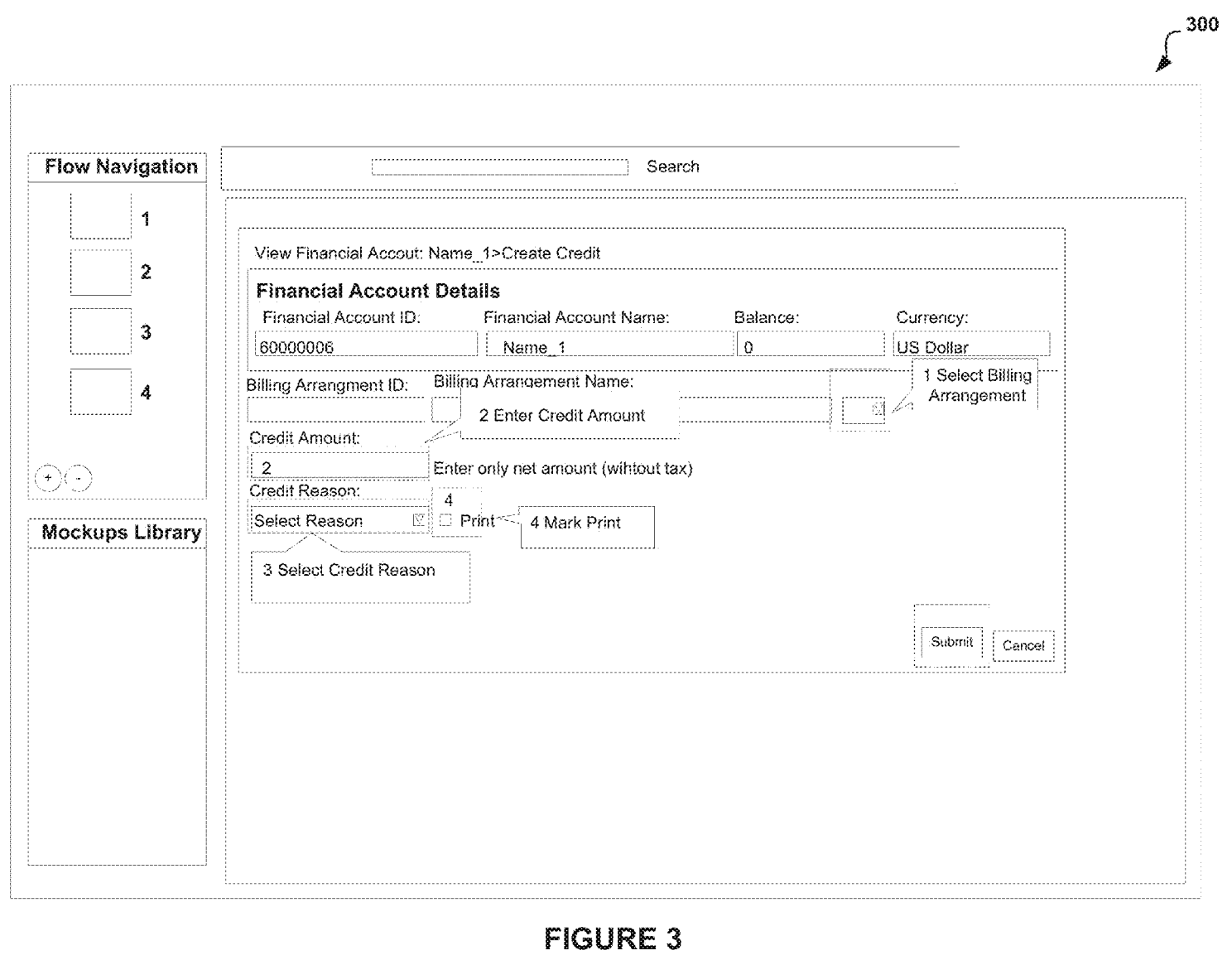

FIG. 3 illustrates a mockup 300 for software testing project design and execution, in accordance with one embodiment. As an option, the mockup 300 may be implemented in the context of the details of the previous figures. Of course, however, the mockup 300 may be implemented in the context of any desired environment. Further, the aforementioned definitions may equally apply to the description below.

The mockup 300 may be generated using a mockup generation tool, thus allowing a visual testing design and execution. As shown, the mockup 300 may identify a testing flow of testable items (e.g. see steps 1-4).

As shown, mockup screens will always show more than the tested area (each testable item may be defined by a section of the screen). Thus, if something happens other than the planned test, the test executer will notice.

Furthermore, marking the exact place the defect occurred on the mockup will allow all who reach the same screen to see the open defects on it and their status.

In practice, utilizing the techniques and tools described herein to implement various test designs has shown a 28% reduction in overall test design effort and 32% reduction in test execution effort and test execution time.

Figure 4:
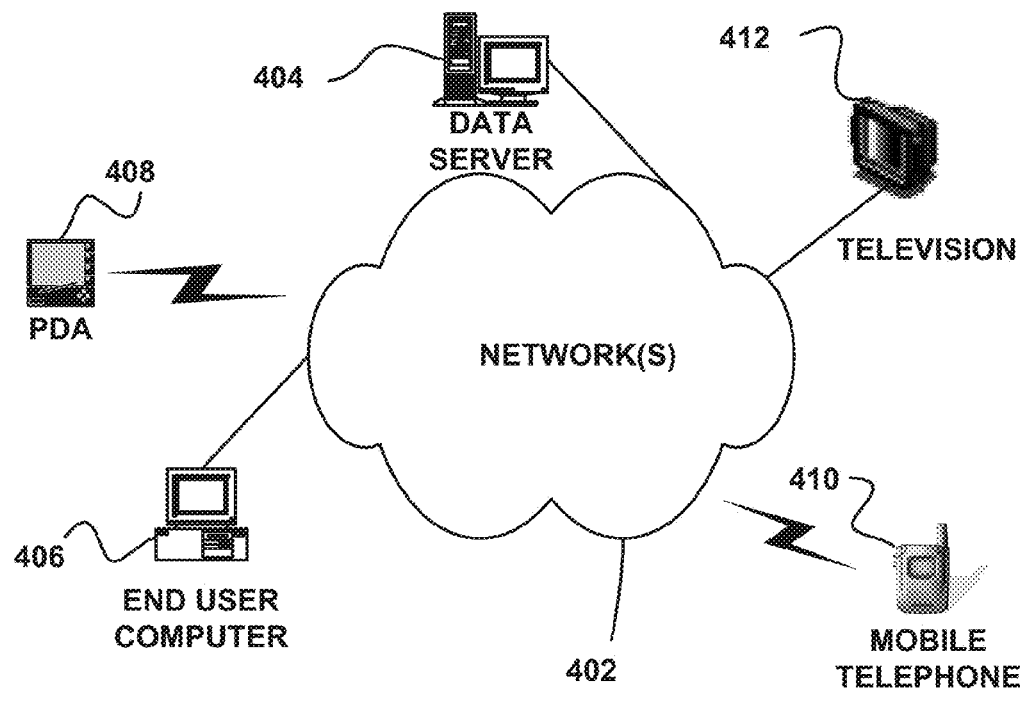
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
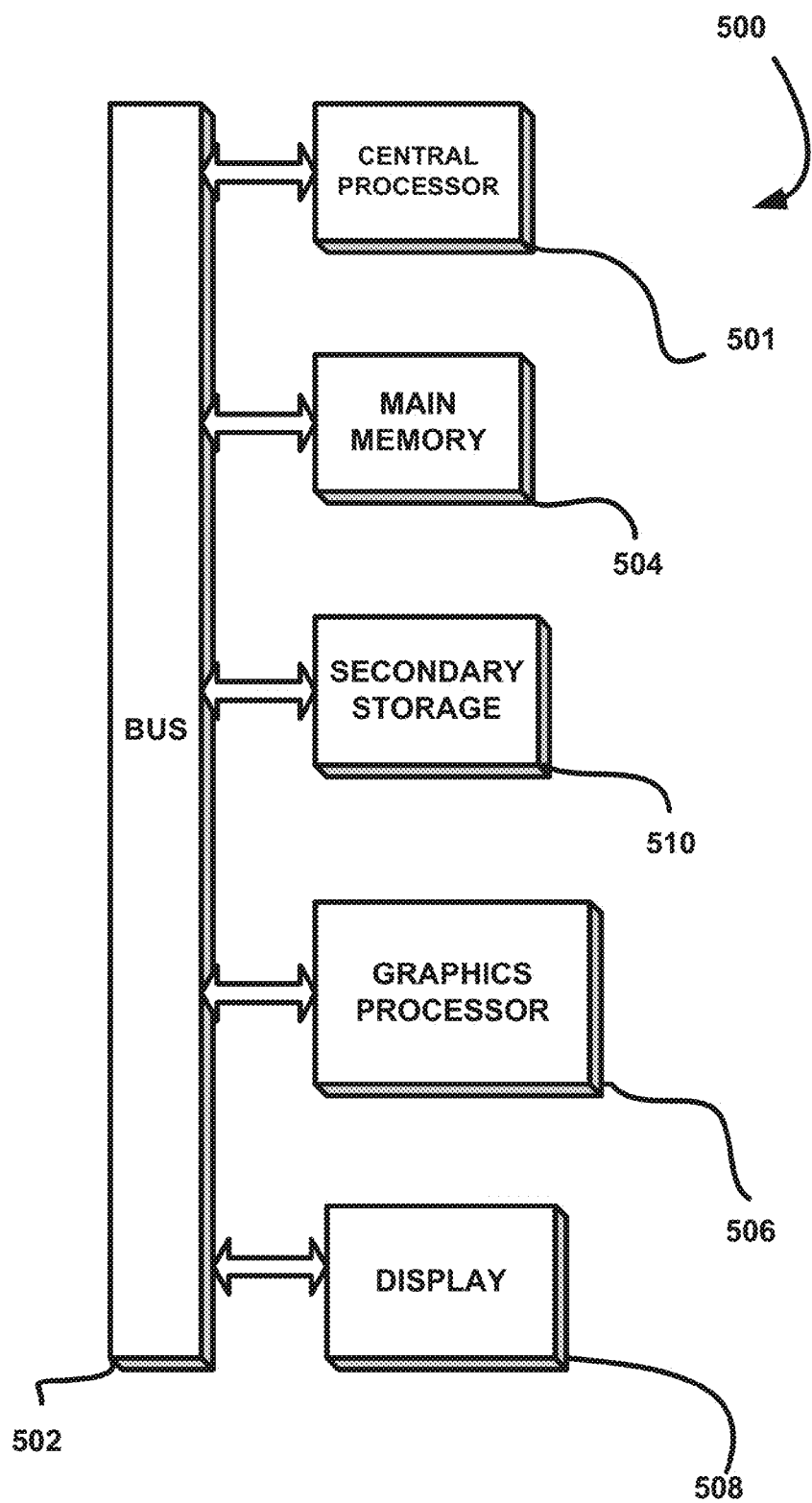
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   displaying to a user, by a system, a mockup of a software testing project, the mockup including a first graphical user interface having a portion of the functionality of a second graphical user interface included within a software design to be tested by the software testing project;
   receiving by the system, from the user, a plurality of textual definitions defining a plurality of testable items associated with the mockup, as well as a number of steps indicating an order in which the plurality of testable items are to be tested by a plurality of testers;
   simultaneously displaying to the plurality of testers by the system both the first graphical user interface included in the mockup of the software testing project, including the plurality of textual definitions received from the user, as well as the second graphical user interface included within the software design to be tested;
   receiving by the system, from one of the plurality of testers, an annotation to the first graphical user interface indicating a defect associated with a testing of the second graphical user interface; and
   updating the first graphical user interface included in the mockup of the software testing project that is displayed to each of the plurality of testers to indicate the annotations to the first graphical user interface received from the one tester, such that all of the plurality of testers may view all reported defects associated with the testing of the second graphical user interface.

2. The computer program product of claim 1, wherein the mockup includes a mockup of a graphical user interface associated with supporting testing tools.

3. The computer program product of claim 1, wherein the one or more test cases are tracked in a quality center.

4. The computer program product of claim 1, wherein the updating is performed immediately.

5. The computer program product of claim 1, wherein the textual definitions are associated with one or more actions to be performed.

6. The computer program product of claim 1, wherein the computer program product is operable such that the at least one mockup is annotated with a status associated with the test execution.

7. The computer program product of claim 1, further comprising computer code for reporting the defect to a quality center.

8. The computer program product of claim 1, further comprising computer code for reporting information associated with the test execution to a quality center.

9. The computer program product of claim 1, wherein the computer program product is operable such that each of the one or more testable items is defined by a section of a screen associated with the first graphical user interface.

10. A method, comprising:
    displaying to a user, by a system, a mockup of a software testing project, the mockup including a first graphical user interface having a portion of the functionality of a second graphical user interface included within a software design to be tested by the software testing project;
    receiving by the system, from the user, a plurality of textual definitions defining a plurality of testable items associated with the mockup, as well as a number of steps indicating an order in which the plurality of testable items are to be tested by a plurality of testers;
    simultaneously displaying to the plurality of testers by the system both the first graphical user interface included in the mockup of the software testing project, including the plurality of textual definitions received from the user, as well as the second graphical user interface included within the software design to be tested;
    receiving by the system, from one of the plurality of testers, an annotation to the first graphical user interface indicating a defect associated with a testing of the second graphical user interface; and
    updating the first graphical user interface included in the mockup of the software testing project that is displayed to each of the plurality of testers to indicate the annotations to the first graphical user interface received from the one tester, such that all of the plurality of testers may view all reported defects associated with the testing of the second graphical user interface.

11. A system comprising:
    a memory system; and
    one or more processing cores coupled to the memory system and that are each configured to perform a method, comprising:
       displaying to a user, by the system, a mockup of a software testing project, the mockup including a first graphical user interface having a portion of the functionality of a second graphical user interface included within a software design to be tested by the software testing project;
       receiving by the system, from the user, a plurality of textual definitions defining a plurality of testable items associated with the mockup, as well as a number of steps indicating an order in which the plurality of testable items are to be tested by a plurality of testers;
       simultaneously displaying to the plurality of testers by the system both the first graphical user interface included in the mockup of the software testing project, including the plurality of textual definitions received from the user, as well as the second graphical user interface included within the software design to be tested;
       receiving by the system, from one of the plurality of testers, an annotation to the first graphical user interface indicating a defect associated with a testing of the second graphical user interface; and
       updating the first graphical user interface included in the mockup of the software testing project that is displayed to each of the plurality of testers to indicate the annotations to the first graphical user interface received from the one tester, such that all of the plurality of testers may view all reported defects associated with the testing of the second graphical user interface.

\* \* \* \* \*

UNITED STATES PATENT AND TRADEMARK OFFICE
CERTIFICATE OF CORRECTION

| | | |
|---|---|---|
| PATENT NO. | : 9,122,799 B1 | Page 1 of 1 |
| APPLICATION NO. | : 14/288328 | |
| DATED | : September 1, 2015 | |
| INVENTOR(S) | : Sharon Elgarat | |

It is certified that error appears in the above-identified patent and that said Letters Patent is hereby corrected as shown below:

In the Claims:
At column 6, claim number 11, line number 39; please replace "project:" with --project;--;
At column 6, claim number 11, line number 44; please replace "testers:" with --testers;--;
At column 6, claim number 11, line number 51; please replace "tested:" with --tested--.

Signed and Sealed this
Fifth Day of April, 2016

Michelle K. Lee
*Director of the United States Patent and Trademark Office*